United States Patent Office 2,969,340
Patented Jan. 24, 1961

2,969,340

PROCESS OF PREVENTING THE SEPARATION OF POLYETHYLENE AND WAX COMPRISING THE ADDITION OF WATER

John J. Kaufman, New Brighton, and Philip R. Templin, Oakmont, Pa., assignors to Gulf Research & Development Company, Pittsburgh, Pa., a corporation of Delaware No Drawing. Filed May 9, 1958, Ser. No. 734,120

2 Claims. (Cl. 260—28.5)

This invention relates to an improved paraffin wax composition and to an improved process for preparing the same.

Paraffin wax compositions, especially paraffin wax, in admixture with a resin such as polyethylene, have wide commercial applications, particularly as coatings or impregnants for cellulosic materials such as paper. A composition comprising paraffin wax and polyethylene, for example, is especially desirable for such purpose, as well as others, because such compositions possess attractive features such as improved tensile strength, improved sealing strength, etc. In preparing a composition comprising paraffin wax and polyethylene or in using such composition, for example, in coating or impregnating a fibrous material, it becomes necessary to heat the composition to a temperature above about 95° C. However, when such composition is subsequently permitted to cool down to a temperature of about 65° to about 80° C., but generally a temperature of about 70° to about 78° C., the polyethylene has a tendency to separate from the paraffin wax and settle out of solution. This is particularly undesirable when such compositions are employed commercially, for the resulting compositions no longer being homogeneous cannot always be employed for the purpose for which they were blended.

We have found that compositions comprising paraffin wax and polyethylene which have been heated to a temperature of at least about 95° C. can be rendered stable and the objectionable features noted above can be substantially avoided by adding to the composition while the same is at a temperature of about 82° to about 93° C., preferably about 86° to about 91° C., about $\frac{1}{1000}$ to about $\frac{1}{10}$, but preferably about $\frac{1}{500}$ to about $\frac{1}{20}$ percent by weight of water based on the original composition.

The composition of paraffin wax and polyethylene can be blended in any suitable manner but preferably is prepared by blending the polyethylene into the molten paraffin wax with the use of a mixer such as an Eppenbach Homomixer at a temperature of about 90° C. to about 110° C. and a pressure of about 0 to about 10 pounds per square inch gauge, for a period of time that can vary from about one to about 30 minutes.

The paraffin waxes which can be used in the composition can be defined as hard, crystalline hydrocarbon waxes such as are derived from mineral oils of the mixed base or paraffinic base type, from shale oils or the Fischer-Tropsch synthesis of hydrocarbons, having a melting point of about 90° to about 150° F., preferably about 115° to about 140° F. The polyethylene used in a semi-solid to solid polymer of ethylene having a molecular weight of about 1000 to about 20,000, preferably about 2000 to about 10,000.

The amount of paraffin wax which can be present in the composition of this invention can be about 80 to about 99.75 percent by weight, preferably about 90 to about 99.5 percent by weight. The polyethylene, in similar fashion, can be present in an amount corresponding to about 0.25 to about 20 percent by weight, preferably about 0.5 to about 10 percent by weight.

In addition to paraffin wax and polyethylene the composition of this invention can contain about 0.1 to about 20 percent by weight based on the final composition of a rubbery isobutylene polymer such as polyisobutylene having a molecular weight of about 1000 to about 1,000,000, preferably about 10,000 to about 100,000, and microcrystalline wax in an amount which can be about 0.5 to about 35 percent by weight relative to the final composition. Also present in small amounts can be antioxidants, such as bis(2-hydroxy, 3-tertiary butyl, 5-methyl phenyl)methane; vegetable and insect waxes, such as candelilla wax, esparto wax, beeswax and Chinese insect wax; gums and resins such as ester gum, gum dammar, rosin and rubber; ozokerite; high molecular weight alcohols; carnauba wax; petrolatum; hydrogenated castor oil; montan wax, etc.

The amount of water which is added to the composition of this invention must be at least about $\frac{1}{1000}$ to about $\frac{1}{10}$ percent, but preferably should be at least about $\frac{1}{500}$ to about $\frac{1}{20}$ percent by weight based upon the total of paraffin wax and polyethylene present. In the event excess water is employed it can be removed from the composition by any convenient method, for example, by decantation. The water can be added to the mixture in any convenient manner but preferably the addition is made while the mixture is being stirred. The temperature at which the addition is made to the paraffin wax composition is critical. As noted, such temperature should be about 82° to about 93° C., preferably about 86° to about 91° C. In the event the addition of water is made at a temperature higher or lower than such critical temperatures, separation of polyethylene from paraffin wax, and subsequently settling, will occur. The pressure at which water addition can be effected can vary over a wide range, but for purposes of economy we prefer to employ atmospheric pressure.

The invention can further be illustrated by reference to the following examples. Two of the polyethylenes employed in the examples, G201 and AC6, are made by Allied Chemical and Dye Corporation. G201 was found to have a molecular weight of 2000 and the following physical properties.

| | |
|---|---|
| Melting point _____ ° F__ | 185–187 |
| Penetration, ASTM D1321, 100 g., 5 sec., 77° F. _____ | 7 |
| Viscosity at 140° C. _____centipoises__ | 230 |
| Cloud point (2% in paraffin) _____ ° F__ | 164 |

AC6 was found to have a molecular weight of 2000 and the following physical properties:

| | |
|---|---|
| Melting point _____ ° F__ | 207–216 |
| Penetration, ASTM D1321, 100 g., 5 sec., 77° F. | 3–5 |
| Viscosity at 140° C. _____seconds Fural__ | 185 |
| Specific gravity _____ | 0.92 |

Example I below shows that when a paraffin wax-polyethylene mixture is heated to a temperature of 85° C. it is not necessary to add water thereto in order to prevent polyethylene from settling out of the mixture.

Example I

A twenty-gram sample containing 98 percent by weight of 128° A.M.P. paraffin wax and 2 percent by weight of G201 was placed in a test tube and the contents heated to a temperature of 85° C. and held at this temperature for 10 minutes. The test tube was placed in an immersion bath at 73° C. and held there for 16 hours. No separation or settling occurred. The sample was held in the bath at a temperature of 73° C. for an additional 50 hours. No separation or settling was apparent.

In Example II it is shown that after heating to a temperature of 95° C. separation and settling of polyethylene will start to occur if cooled to about 73° C.

*Example II*

The run of Example I was repeated with the exception that the mixture was heated to 95° C. prior to immersion in the bath at 73° C. At the end of 16 hours some settling had occurred. At the end of 66 hours some settling was still apparent.

Examples III and IV below further show that settling becomes more troublesome as the temperature of the mixture is raised.

*Example III*

The run of Example I was again repeated, with the exception that the mixture was heated to 105° C. When the mixture was held at 73° C. for 16 hours, considerable amount of polyethylene had separated out of the mixture and settled to the bottom of the test tube. At the end of 66 hours, the polyethylene had substantially completely separated out of solution.

*Example IV*

Again the run of Example I was repeated except that the mixture was heated to 115° C. When the mixture was held at 73° C. for 16 hours, considerable settling of polyethylene had occurred; at the end of 66 hours, there was almost complete settling.

In the following example, there is illustrated a typical procedure for preventing separation of polyethylene from paraffin wax in accordance with our invention.

*Example V*

The same procedure employed in Example IV was used. The mixture at 115° C. was permitted to cool to a temperature of 90°, at which temperature 1/10 percent by weight of water was added to the mixture by stirring. The resultant mixture was then maintained at a temperature of 73° C. for 66 hours. There was no indication that any separation or settling of polyethylene had occurred.

The invention is further illustrated below in Examples VI, VII, VIII and IX. In each of these examples the mixture comprises 96 percent by weight of 128 A.M.P. paraffin wax and 4 percent by weight of G201.

*Example VI*

Twenty grams of the above mixture at 95° C. were placed in a test tube and then held in a constant temperature bath for 65 hours. Polyethylene almost completely settled out of the mixture. A similar sample was cooled to 90° C. in air and one percent by weight of water was added thereto. This amounted to an excess of at least about 9/10 percent by weight of water. This excess water was found to repose in the bottom of the test tube. The treated mixture was then placed in the bath at 71° C. for 65 hours. No separation or settling out of polyethylene was noted.

That water cannot be added to the mixture at a temperature in excess of 82° to 93° C. is apparent from an examination of Examples VII and VIII.

*Example VII*

The same composition of Example VI was heated to a temperature of 115° C. and immediately thereafter was placed in a constant temperature bath at 71° C. for a period of 65 hours, at the end of which time polyethylene had substantially completely settled out of the composition. When this run was repeated under identical conditions, except that one percent by weight of water was added to the mixture at 115° C., almost complete separation of polyethylene occurred when the mixture was maintained at 71° C. for 65 hours.

Mere cooling in progressive stages, without water addition, does not prevent separation of polyethylene from paraffin wax, as shown below in Example VIII.

*Example VIII*

The same composition of Example VI was heated to 115° C. and then air-cooled over a period of 10 minutes to 90° C. After the mixture was maintained at the latter temperature for about one minute, it was placed in a constant temperature bath of 71° C. for 65 hours. Almost complete separation of polyethylene had occurred during the 65-hour period.

The addition of water to such mixture at a temperature within the defined critical ranges helps solve the problem of Example VIII. This is shown below in Example IX.

*Example IX*

The run of Example VIII was repeated except that at a temperature of 90° C. one percent by weight of water was added to the mixture. At the end of 65 hours in a constant temperature bath of 71° C. no separation of polyethylene was detected.

That the addition of water must be made within a critical temperature range and no amount of water will suffice if this is not done is apparent from Example X below.

*Example X*

Two blends were prepared, each containing 96 percent by weight of 128 A.M.P. wax. One of the blends contained 4 percent by weight of G201, the other the same amount of AC–6. Six samples of each of the blends amounting to 20 grams of each were heated to 95° C. In the first sample of each no water was added. In the next five samples of each one percent, 1/10 percent, 2/100 percent, 9/1000 percent and 9/10,000 percent by weight of water was added to the sample at 95° C. The samples were then held in a constant temperature bath of 70° C. for 100 hours. In each case there was a slight settling of polyethylene.

The invention is further illustrated in Example XI with compositions different from those employed hereinabove.

*Example XI*

Four blends were prepared. In the first blend, there was 95 percent by weight of 128° A.M.P. wax, 3 percent by weight of microcrystalline wax and 2 percent by weight of polyethylene having a molecular weight of 7000. The second blend contained 95 percent of the same paraffin wax, 3 percent of microcrystalline wax and 2 percent of AC–6. The third blend included 88 percent of the paraffin wax, 10 percent of the microcrystalline wax and 2 percent of polyethylene having a molecular weight of 7000. The last blend contained 88 percent of the paraffin wax, 10 percent microcrystalline wax and 2 percent G–201. Four separate portions, each containing 20 grams of each of the above blends, were heated to 115° C. They were immediately placed in a constant temperature bath of 68° C. for 16 hours. In each case there was almost complete separation and precipitation of polyethylene. Four similar samples were air-cooled from a temperature of 115° C. to 90° C. After being held at the latter temperature for 2 minutes, they were maintained in a constant temperature bath of 68° C. for 16 hours. Considerable separation and settling of polyethylene occurred. Four additional samples of the above blends after being heated to 115° C. were air-cooled to 90° C. and held for a period of 2 minutes. At the latter temperature one-half percent by weight of water was added to the mixture. The resulting mixture was then held at a temperature of 68° C. for a period of 16 hours. No settling of polyethylene was noted.

Obviously, many modifications and variations of the invention, as hereinabove set forth, can be made without departing from the spirit and scope thereof, and

We claim:

1. A process for preventing the separation and settling out of polyethylene from a mixture comprising about 0.25 to about 20 percent by weight of said polyethylene and about 80 to about 99.75 percent by weight of paraffin wax which has been heated to a temperature above about 95° C., which comprises adding at least about 1/1000 to about 1/10 percent by weight of water to said mixture while said mixture is at a temperature of about 82° to about 93° C.

2. A process for preventing the separation and settling out of polyethylene from a mixture comprising about 0.25 to about 20 percent by weight of said polyethylene and about 80 to about 99.75 percent by weight of paraffin wax which has been heated to a temperature above about 95° C., which comprises adding at least about 1/500 to about 1/20 percent by weight of water to said mixture while said mixture is at a temperature of about 86° to about 91° C.

References Cited in the file of this patent

UNITED STATES PATENTS

| | | |
|---|---|---|
| 2,551,087 | Bainhart et al. | May 1, 1951 |
| 2,642,366 | Rumberger | June 16, 1953 |
| 2,728,735 | Anderson | Dec. 27, 1955 |
| 2,733,225 | Smith | Jan. 31, 1956 |
| 2,758,100 | Bailly et al. | Aug. 7, 1956 |
| 2,828,219 | Heiges et al. | Mar. 25, 1958 |